United States Patent Office 3,188,575
Patented June 8, 1965

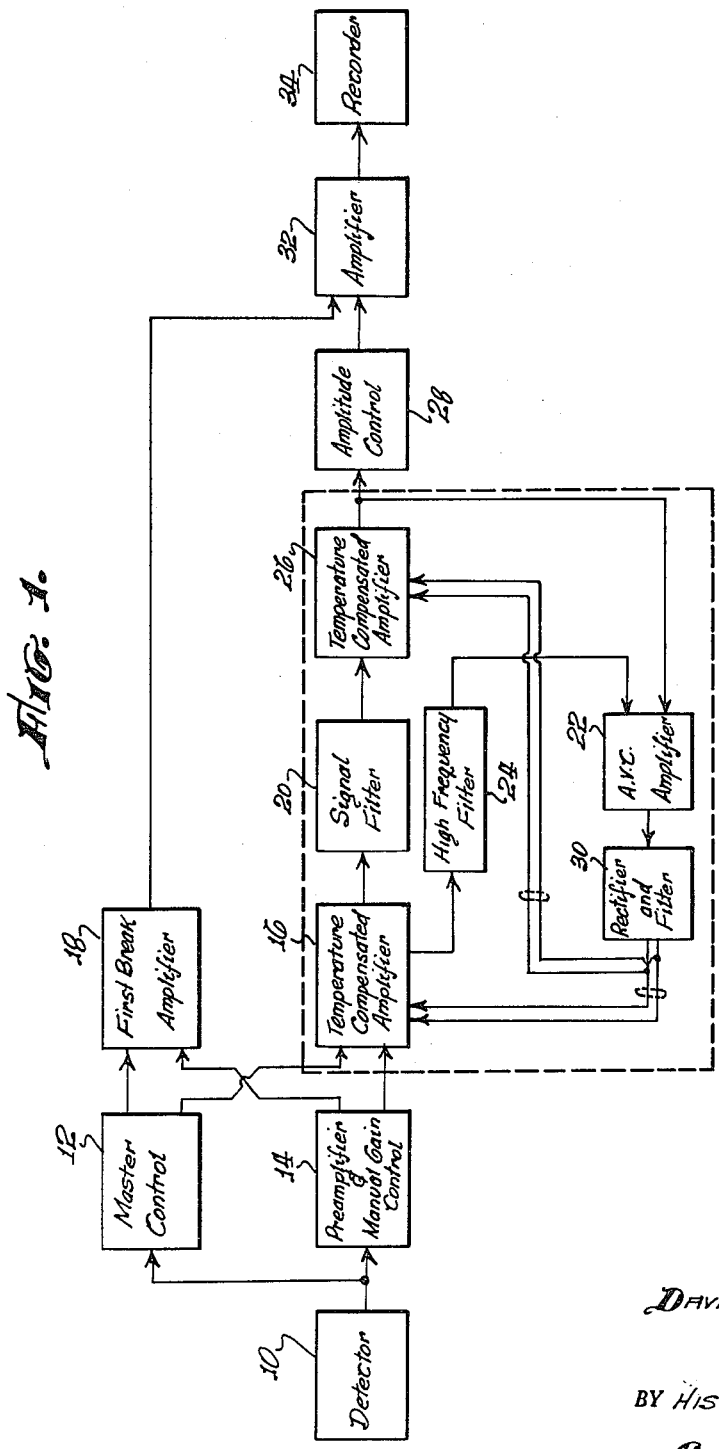

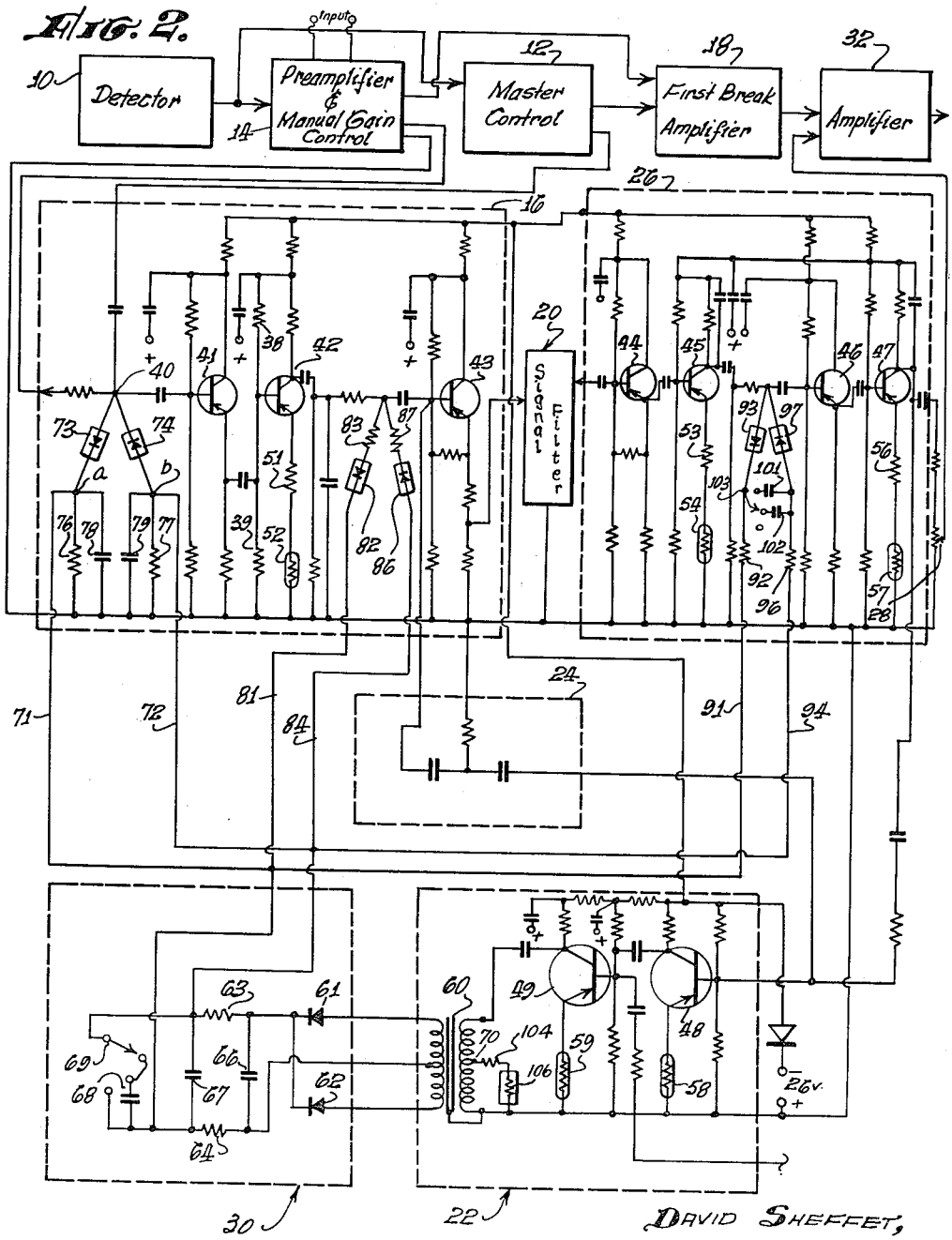

3,188,575
AUTOMATIC VOLUME CONTROL SYSTEM FOR SEISMOGRAPH AMPLIFIER SYSTEM
David Sheffet, Altadena, Calif., assignor to Western Geophysical Company of America, Los Angeles, Calif., a corporation of Delaware
Filed Oct. 16, 1961, Ser. No. 145,036
6 Claims. (Cl. 330—23)

This invention relates to seismic exploration and more particularly to multi-channel amplifier systems for use in seismic geophysical surveying apparatus. This application is a continuation-in-part of co-pending application Serial No. 49,700, now abandoned, filed August 15, 1960 entitled Geophysical Amplifier by David Sheffet.

In making seismographic surveys by the so-called reflection method, an explosive charge is detonated on or beneath the surface of the earth and the resulting seismic disturbances are measured by groups of seismic detector units placed at a number of preselected locations, twenty-four locations usually being selected. The seismic detector units are electrical transducers which detect the mechanical energy from the earth's vibrations and convert it to an electrical signal having an instantaneous magnitude proportional to the amount of mechanical energy detected. The electrical signal from each detector unit is fed into a channel of a multi-channel amplifying system and then to a multi-channel recorder.

In general, the record produced by the recorder shows seismic waves which have traversed paths close to the earth's surface and waves which have penetrated the earth and have been reflected by interfaces between two layers of different properties or characteristics. In many cases several interfaces are present at varying depths and the record will show waves reflected from such interfaces. The amplitude of such reflected waves will vary over a considerable range depending upon a reflection coefficient associated with each interface. Hence, the amplifying system of the seismographic exploration apparatus must provide for a very wide amplitude range of received seismic signals together with sufficient resolution to detect pulses of relatively small magnitude immediately following a pulse of a very large magnitude. In addition, the operational characteristics of such an amplifier system must remain constant over the extremely wide range of temperature variation frequently encountered in the field in geophysical work.

Geophysical amplifiers have heretofore utilized vacuum tube amplifiers. However, such amplifiers have relatively high power requirements and field operation requires the use of relatively heavy and bulky power supply units. Because of the weight and bulk of such amplifier systems, together with the fragility of vacuum tubes, it is not convenient to transport the systems over difficult terrain for use in relatively inaccessible locations. A rugged, lightweight amplifier system would result from the utilization of semiconductor devices to replace the vacuum tubes. However, semi-conductor devices are much more temperature sensitive than vacuum tubes and transistorized geophysical amplifier systems currently in use contain complicated temperature compensating circuitry of varying effectiveness. Flexibility in AVC recording speed is not possible with present art amplifiers of the character under consideration.

Accordingly, it is an object of the present invention to provided improved methods and apparatus for amplifying a seismic detector signal.

It is also an object of the present invention to provide improved geophysical amplifier systems capable of resolving closely spaced signal pulses of greatly different amplitudes.

It is another object of the present invention to provide improved geophysical amplifier systems utilizing AVC-controlled amplifier stages in which the AVC response characteristic is adjustable.

It is a further object of the present invention to provide temperature compensated apparatus for amplifying a seismic detector signal.

It is a still further object of the present invention to provide rugged, lightweight geophysical amplifier systems.

Other objects and a further understanding of the present invention may be had by reference to the following description taken in conjunction with the accompanying drawing in which:

FIGURE 1 shows a block diagram of one channel of the amplifier system of the present invention; and FIGURE 2 shows the schematic diagram of suitable amplifier stages.

Upon firing a seismic shot the leading edge of the first wave to reach the detector unit is called the "first-break" signal. It is desirable to record the exact arrival time of the first-break signal in order to provide a time reference point on the recording tape. The first-break signal is followed by signals derived from a relatively large surface wave and subsequent reflected waves of various amplitudes.

To provide for the expected wide variations in signal amplitude the present invention geophysical amplifier channels provide cascaded variable-gain amplifier stages, including a selective filter network to prohibit the passage therethrough of signals of frequencies which would interfere with the recording of reflected waves from subterranean beds. Since the first-break signal is of a relatively high frequency which will be greatly attenuated by the filter, the first-break signals are bypassed through an unfiltered fixed gain amplifier stage temporarily connected in shunt with the variable gain amplifier stages. The objects of the present invention are achieved through the use of novel temperature-compensated, transistorized circuitry. The variable gain amplifier stages in the device of the present invention are regulated by a novel automatic volume control system wherein the AVC characteristics are adjustable, thereby resulting in an extremely flexible detecting system by permitting rapid change in the AVC recording speed.

Referring now to FIGURE 1 of the drawing, there is shown a block diagram of a presently preferred embodiment of one channel of a multi-channel geophysical amplifier system in accordance with the concepts of the present invention. A seismic detector unit 10 is positioned at a predetermined location on the earth's surface. Actually many such units are typically employed; only one being shown for clarity of explanation. The output from the seismic detector 10 is fed to a master control unit 12 and to a preamplifier and manual gain control 14. A first output from the preamplifier 14 is fed to a temperature compensated amplifier 16 and a second output fed to a first-break amplifier 18. A first output from the master control unit 12 is fed to the amplifier 18 and a second output fed to the amplifier 16. The master control unit 12 serves all of the channels of the multi-channel system, the master control 12 providing a pair of outputs for the respective first-break and temperature compensated amplifiers of each of the other channels of the system. The master control unit is fed an input signal from only one seismic detector unit, usually the seismic detector unit located farthest from the shot point (the detector 10 in the illustrated embodiment).

A first output from the amplifier 16 is fed to a signal filter 20 and a second output fed to an AVC amplifier 22 through a pre-bias filter 24. The output from the signal filter 20 is fed to a temperature compensated amplifier 26, the output of the amplifier 26 being fed to an amplitude control 28 and to the AVC amplifier 22.

The output of the AVC amplifier 22 is fed to a rectifier-filter 30. The filtered output of the rectifier-filter 30 is fed to the temperature compensated amplifiers 16 and 26.

The output from the amplitude control 28 is fed to an amplifier 32. The output of the first-break amplifier 18 is also fed to the amplifier 32. The output of the amplifier 32 is fed to one channel of a multi-channel recorder 34.

When the system of FIGURE 1 is in a state of readiness preparatory to the firing of a seismic shot, an A.C. "pre-bias" signal is generated by an oscillator in the master control unit 12 and fed from the output of the master control unit 12 to the input of the temperature compensated amplifier 16 and to the corresponding temperature compensated amplifiers in each of the other channels. The pre-bias signal in the channel illustrated in FIGURE 1 is amplified by the amplifier 16 and fed through the pre-bias filter 24 to the AVC amplifier 22. The pre-bias signal is of a much higher frequency than low frequency seismic signals, a common pre-bias signal frequency being on the order of 14 kc. while a typical frequency for a seismic signal is on the order of 30 cycles. The pre-bias filter 24 is of the high-pass type, passing signals only above 10 kc. and rejecting all signals in the seismic spectrum below 200 cycles. The signal filter 20, on the other hand, is a band-pass filter which will readily pass the low frequency electrical signals derived from the seismic detector units, but will greatly attenuate the pre-bias signal. Hence, the pre-bias 14 kc. signal is effectively directed to the AVC amplifier 22, wherein it is amplified and rectified and filtered by the rectifier-filter 30 and then fed to the temperature compensated amplifiers 16 and 26 to properly attenuate the gain of these amplifiers. Therefore, under this pre-bias condition, a signal fed to the preamplifier 14 will be amplified by the first-break amplifier 18 and simultaneously by amplifiers 16 and 26 to deliver two signals in parallel to amplifier 32. The signal components through amplifier 18 are mostly high frequencies to produce a sharp first break (first arrival time) and are cut off when the master control is triggered.

A manual amplitude control in the preamplifier stage 14 is adjustable to provide a desired signal input level to the amplifier 32.

Upon firing of the shot, the seismic detector unit 10 converts the mechanical energy of the earth's vibrations into electrical signals which are simultaneously applied to the input of the master control unit 12 and to the input of the preamplifier stage 14. As mentioned hereinabove, these signals consist of a first-break signal of relatively high frequency and amplitude followed by the lower frequency signals derived from surface and reflected waves. Application of the first arriving signals to the master control unit 12 causes the pre-bias oscillator in that unit to be turned off and a switching pulse to be applied to the first-break amplifier 18 and to the corresponding first-break amplifiers in each of the other channels. Application of the switching pulse to the first-break amplifier 18 causes that amplifier to be turned off after about one to five cycles of the input signal voltage. Shut-off of the pre-bias oscillator in the master control unit 12 causes the rapid decay of the pre-bias voltage applied to the amplifiers 16 and 26. The rate of decay of the pre-bias voltage is greater than the rate of decay of incoming seismic signals so that the seismic signals will be continuously amplified by the amplifiers 16 and 26 while these amplifiers are being returned to their high gain condition of operation. Hence, after reception and amplification of the first-break signals, the first-break amplifier 18 is turned off and the subsequent seismic signals are then amplified by the amplifiers 16 and 26 and the final amplifier 32. The adjustable signal filter 20 greatly attenuates signals of frequencies which would interfere with reflections from subterranean beds. Since the first-break amplifier 18 is now turned off, the signal proceeds through the temperature compensated amplifier 16 to the signal filter 20 and thence to the amplifier 26, the amplitude control 28, the amplifier 32 and then to the recorder 34. The signal output from the amplifier 26 is also fed to the AVC amplifier 22 to cause variations in the gain of the amplifiers 16 and 26 in accordance with the strength of the signals being amplified to thereby permit compression of the signal amplitude without changing its basic wave form. The pre-bias filter 24 effectively prevents the signal from being fed directly from the amplifier 16 to the AVC amplifier 22. Therefore, the relatively high frequency first-break signals proceed from the preamplifier 14 through the first-break amplifier 18 to the amplifier 32, these signals being effectively prevented from passing through the amplifier 26 by the signal filter 20. The subsequent low frequency seismic signals proceed from the preamplifier 14 through the amplifier 16, the signal filter 20, and the amplifier 26 to the amplifier 32, the first-break amplifier 18 then being inoperative.

A study of FIGURE 1 shows that a multiple-loop AVC system is utilized. That is both of the temperature compensated amplifiers 16 and 26 are AVC controlled by AVC amplifier stage 22. As explained hereinabove, preparatory to the firing of a seismic shot, the system is in a pre-biased condition under which the AVC voltage is derived by sampling the output of the amplifier 16 and feeding it to the AVC amplifier 22. Upon firing of the shot and the subsequent reception of signal voltages, the AVC voltages are derived by sampling the signal voltages from the amplifier 26 and feeding them to the AVC amplifier 22. The input signals to the AVC amplifier 22 are amplified, then rectified and filtered in the rectifier-filter 30, the AVC output of the rectifier-filter 30 being a direct current signal which varies in accordance with changes in seismic signal strength. The AVC voltage is applied to the AVC-controlled amplifier stages in the amplifiers 16 and 26 through so-called varistor branch circuits utilizing semiconductor diodes as varistors. Semiconductor diodes are temperature sensitive, their internal resistance decreases with increasing temperature. Hence, the rectifier-driver stage in amplifier 22 is temperature compensated in such a manner as to decrease the AVC voltage appearing at its output upon increases in temperature, thereby offsetting the effect of the decrease in resistance of the semiconductors used as varistors, and maintaining the AVC voltage applied to the amplifiers 16 and 26 at the proper value with changes in temperature. Additionally, since transistors themselves are temperature sensitive, each of the transistor amplifier stages in the amplifiers 16, 22 and 26 are individually temperature compensated in a manner to be hereinafter explained.

Referring now to FIGURE 2, there is shown transistorized circuitry suitable for use in the block units of FIGURE 1 within the dashed line enclosure. Circuitry suitable for the other block units are well known to the art and hence will not be discussed in detail. However, presently preferred circuitry for the first-break amplifier 18 is that disclosed in the present inventor's copending patent application, Serial No. 49,789, filed August 15, 1960, now Patent No. 3,107,307 entitled "Transistor Switching Circuit," also assigned to the present assignee and incorporated herein by reference. Utilization of this novel circuitry provides precise control of the shut off of the first-break amplifier 18.

A study of FIGURE 2 shows that the variable gain, temperature compensated amplifiers 16 and 26 include transistor amplifier stages, the transistor amplifier stages being AVC-controlled from the AVC amplifier 22. However, since the input impedance of transistor amplifier stages is typically relatively low, an impedance transforming emitter follower circuit is provided between each of the varistor, bridges and the immediately subsequent transistor amplifier stage to reduce insertion losses. Furthermore, since varistor circuitry should operate into a constant, relatively high impedance at all frequencies, the second varistor stage is isolated from the filter 20 by means of an emitter follower. Accordingly, the input stage of the temperature compensated amplifier 16 is an AVC controlled emitter follower circuit utilizing a transistor 41. The emitter-follower output of the transistor 41 is fed to a temperature compensated amplifier stage utilizing the transistor 42. The output signal formed from the transistor 42 is fed to an isolating emitter-follower stage utilizing a transistor 43. The emitter-follower output of the transistor 43 is fed through the signal filter 20 and thence to the amplifier 26. The input of the amplifier 26 is an emitter-follower circuit utilizing a transistor 44. The emitter-follower output of the transistor 44 is fed to a temperature compensated amplifier stage utilizing a transistor 45. The output of the transistor 45 is fed to another emitter-follower circuit utilizing a transistor 46. The emitter-follower output of the transistor 46 is fed to another temperature compensated amplifier stage utilizing a transistor 47, the output of the transistor 47 being fed to the amplifier 32 through amplitude control 28. Because the emitter-follower circuits utilizing the transistors 41, 43 and 44 are in the early part of the seismic amplifier wherein the signal levels are extremely low, these emitter-follower circuits must be almost completely free from extraneous noise. Particularly suitable low noise emitter-follower circuits are disclosed in the present inventor's copending patent application, Serial No. 49,718 filed August 15, 1960, now Patent No. 3,168,650 entitled "Low Noise Transistor Circuit," also assigned to the present assignee.

Since transistors are temperature sensitive, the amplifier stage utilizing the transistor 42 in the amplifier 16, the amplifier stages utilizing the transistors 45 and 47 in the amplifier 26, together with other amplifier stages in the preamplifier 14 and the amplifier 32, are individually temperature compensated in a manner to be now explained. The transistors 42, 45 and 47 are of the PNP type and are connected in the well-known common emitter configuration. Each of these amplifier stages employs a series combination of emitter resistance utilizing an ordinary temperature invariant resistor and a resistor having a positive linear temperature coefficient. Resistors having a positive linear temperature coefficient are known in the art as "sensistors," the sensistors being indicated in the figures by the usual resistance symbol enclosed within a generally elliptical shaped curve. Hence, the emitter circuit of the transistor 42 includes the series combination of a resistor 51 and a sensistor 52, the emitter circuit of the transistor 45 includes a series combination of a resistor 53 and a sensistor 54, and the emitter circuit of the transistor 47 includes the series combination of a resistor 56 and a sensistor 57. These series combinations of temperature insensitive resistors which are temperature invariant and sensistors provide temperature compensation for the amplifying transistors as the base-to-emitter resistance of the transistors decreases upon an increase in temperature. The relative resistance values of the resistor and sensistor in each combination is determined by the input and output impedances of the particular stage and the gain desired. The combination of fixed and temperature variant resistance in the emitter circuit, together with the fixed shunting resistance in the base circuit of each of these temperature compensated transistor amplifier stages serves to vary the D.C. operating point of the transistor as a function of temperature to thereby maintain the input resistance of the transistor constant with varying temperature as well as maintaining constant stage gains. For example, the operating point of the transistor 42 in the amplifier 16 is determined by the combination of the resistor 51 and the sensistor 52, together with resistors 38 and 39 in the base circuit. Therefore, the transistor amplifier stage presents a constant load to the preceding emitter-follower stage upon variation in temperature. This method of temperature compensation is quite unlike prior art methods of temperature compensation for transistor amplifier stages in that prior art methods typically utilize temperature sensitive resistors to provide a degenative effect which causes an increase in current amplification with increases in temperatures, a blocking capacitor being provided to prevent the degeneration from affecting the D.C. operating point of the transistor. Thus, the prior art means utilized for providing temperature compensation does not include changing the D.C. operating point of the transistor. Hence, although the transistor is compensated for changes in its own gain, the load the transistor presents to the preceding stage varies with temperature. In the temperature compensation method of the present invention, on the other hand, no blocking capacitors are utilized in the resistive compensation circuit, and the input resistance of the transistor is maintained constant with increasing temperature so that the preceding transistor stage does not have its ouput reduced by the lowered input resistance of a transistor which is compensated only for its own gain and not for its undesirable variable loading effect on the preceding stage. In the present invention method, both the amount of degeneration and the D.C. operating point of the transistor are varied with temperature, both of these effects being simultaneously obtained by a single positive coefficient resistor in combination with series and shunt temperature invariant resistors through which the D.C. transistor current flows. This produces a transistor amplifier stage which has both constant gain and constant input loading impedance with wide variations in temperature.

A similar type of temperature compensation is included in the transistors of the AVC amplifier 22. The AVC amplifier 22 includes two transistor amplifier stages utilizing transistors 48 and 49 connected in the common-emitter circuit configuration. A sensistor 58 is used as the emitter resistance of the transistor 48 and a sensistor 59 is used as the emitter resistor of the transistor 49. Signal voltages from the output of the amplifier 26 are fed to the base element of the transistor 48. The signals are amplified by the transistor 48 and further amplified by the transistor 49 and impressed across the tapped primary winding of a rectifier driver transformer 60. Connected between a tap 70 and one end of the primary winding, and therefore partially shunting the primary winding of the transformer 60, is the series combination of a resistor 104 and a thermistor 106. Thermistors are resistance devices possessing negative temperature coefficient of resistance and are well known in the art. Since the thermistor 106 and the resistor 104 are shunted across a portion of the primary winding of the rectifier transformer 60, it is seen that an increase in temperature will cause a relative decrease in the output voltage appearing across the secondary winding of the transformer 60 due to the shunting effect of the resistor 104 and the thermistor 106. As the temperature increases and the resistance of the thermistor 106 decreases, the primary loading of the transformer 60 increases, and at very high temperatures a portion of the primary winding would be short-circuited if it were not for the presence of the limiting resistor 104. Thus, it is seen that the output of the AVC amplifier 22 is relatively decreased in a non-linear fashion as temperature increases. The purpose of this type of temperature compensation, aside from the individual compensation of the amplifier stages within the AVC amplifier 22, is to compensate for the temperature characteristics of the semiconductor devices used as varistors in the AVC circuit, in a manner to be hereinafter explained.

The secondary winding of the rectifier transformer 60 is connected to the rectifier-filter 30. The rectifier-filter 30 includes a full wave rectifier circuit composed of semiconductor diode rectifiers 61 and 62. The rectified AVC output voltage appears between the center tap of the secondary winding of the rectifier transformer 60 and the junction of the diode rectifiers 61 and 62. This rectified AVC output voltage is then filtered by a low pass filter comprising series resistors 63 and 64, fixed shunt capacitors 66 and 67, together with an additional filter capacitor 68 selectively insertable as a shunt capacitor by means of a manual switch 69. The selective insertion of the filter capacitor 68 enables controlled variation of AVC shunt capacitance and hence of AVC response time. The output from the rectifier-filter 30 is taken across the shunt capacitor 67 and thence fed to two of the stages of the amplifier 16 over leads 71, 72, 81 and 84 and to one of the stages of the amplifier 26 over leads 91 and 94. The AVC voltage is fed to the input varistor of the transistor 41 over electrical leads 71 and 72 which connect to a varistor bridge circuit comprising semiconductor diodes 73 and 74 meeting at junction 40 and resistors 76 and 77. The resistor 76 is shunted by a small capacitance 78 and the resistor 77 is shunted by a small capacitance 79. The junctions intermediate the resistor capacitor bars connected to the diode 73 and 74 are labeled as a and b respectively. The rectified and filtered AVC voltage is fed from the output of the rectifier-filter 30 to the input circuit of the transistor 43 by an electrical lead 81, a semiconductor diode 82 and a resistor 83, and by an electrical lead 84, a semiconductor diode 86 and a resistor 87. The AVC output voltage is fed from the rectifier-filter 30 to the input circuit of the transistor 46 and the amplifier 26 over the electrical lead 91, resistor 92 and a semiconductor diode 93, and over an electrical lead 94, a resistor 96 and a semiconductor diode 97. Connected to the junction between the resistor 96 and the semiconductor diode 97 is one end of a capacitor 101 and one end of a capacitor 102, the other ends of the capacitors 101 and 102 being connected to different poles of a three-pole switch 103. The selector arm of the switch 103 is connected to the junction between the resistor 92 and the semiconductor diode 93. There is no connection to the third pole of the switch 103. Hence, by rotation of the selector arm of the switch 103 either or none of the capacitors 101 and 102 can be selectively connected in shunt across the series combination of diodes 93 and 97 in the third diode bridge circuit to alter the AVC action of this third bridge circuit. The resistors 92 and 96 provide isolation of the capacitors 101 and 102 from the main AVC filter, so that these capacitors have very little direct effect on the AVC action of the other diode bridge circuits. Furthermore, the resistors 92 and 96 act in combination with the selected capacitor 101 or 102 to provide a controllable additional time delay action on the third diode bridge circuit, in a manner to be explained hereinbelow. The use of varistors in the AVC circuitry of geophysical amplifiers is well known in the art and hence will not be discussed in further detail.

It is presently preferred to use semiconductor diodes as the varistors in the present invention AVC circuitry because of the reliability and extremely small size of the diodes. However, it has been found that silicon semiconductor diodes possess a negative temperature coefficient, that is, the internal resistance of the diodes decreases as the temperature increases. Therefore, it is seen that the use of silicon semiconductor diodes as varistors in the utilized AVC circuit tends to cause variations in AVC voltage upon changes in temperature, an increase in temperature resulting in a relative reduction in amplifier output due to an increase in the diode attenuation and a decrease in temperature causing an increase in amplifier output due to a decrease in diode attenuation. However, the resistance values of the resistor 54 and the thermistor 56 in the AVC amplifier 22 are selected to cause an appropriate automatic adjustment in the output voltage of the AVC amplifier 22 to thereby compensate for changes in the resistance of the silicon semiconductor diodes 73, 74, 82, 86, 93 and 97 upon changes in temperature. In the illustrative embodiment, the temperature compensation is effective from an initial design point of 75° F. up to 140° F. and down to −40° F.

Returning briefly to a study of FIGURE 1, it is seen that the AVC circuit utilized is a multi-loop circuit, signal voltages being derived during periods of seismic signal detection from the amplifier 26, and the resulting AVC output voltage being applied to stages within both of the amplifiers 16 and 26. A first AVC loop can be traced from the output of the rectifier-filter 30 through the amplifier 16, the signal filter 20 and the amplifier 26 back to the AVC amplifier 22. A second AVC loop can be traced from the output of the rectifier-filter 30 through the amplifier 26 and back to the AVC amplifier 22. Considering the first AVC loop, it is apparent that the signal filter 20 contributes a material portion of the time delay in this AVC loop, and therefore slows down the attack and release time of the AVC action of the temperature compensated amplifier stages in the amplifier 16. It is also apparent that the semiconductor diodes 93 and 97 in the amplifier 26 (see FIGURE 2) operate at a higher signal level than the diodes 73, 74, 82 and 86 in the amplifier 16. Even though the signal fed to the amplifier 26 is a partially AVC controlled signal, the action of the diodes 93 and 97 still is primarily controlled by the AVC voltage derived from the rectifier-filter 30 and applied through the second AVC loop. Since this second AVC control loop excludes the signal filter 20 and because the diodes 93 and 97 operate at higher signal levels than the diodes in the amplifier 16, the AVC action in the amplifier 26 is inherently faster than the AVC action in the amplifier 16.

If the amplifier 26 was not AVC controlled, the AVC action of the diodes in the amplifier 16 would provide ample attenuation for all signals encountered in the range of seismic recordings; however, the AVC bias would be much higher and consequently charge the AVC filter capacitors 66 and 67 (and the capacitor 68 when it is switched in the circuit) to a higher level. It is well known in the art that the AVC speed is not merely a function of RC time constants in a filter, but also depends upon the absolute value of the AVC voltage applied to the filter capacitors. The effect of the second AVC control loop and the AVC control of the amplifier 26 is to reduce the actual D.C. voltage on the AVC control lines to thereby permit faster AVC attach and release times. Additional flexibility is provided by the novel use of capacitors 101 and 102 which are connectable across the AVC line in the second AVC loop by the switch 103. The purpose of providing a multiple selection of capacitance values of AVC capacitors in the second AVC loop is to provide more useful combinations of AVC speeds. The isolating resistors 92 and 96, together with the appropriate capacitor 101 or 102 enables selection of a filter characteristic which will provide a predetermined AVC speed. As mentioned hereinabove, the isolating resistors 92 and 96 effectively isolate the capacitors 101 and 102 from the main AVC filter so that these capacitors have very little direct effect on the AVC action of the diodes in the amplifier 16. The resistors 92 and 96 also act in combination with the appropriate one of capacitors 101 and 102 to produce a controllable additional time delay action on the diodes 93 and 97. If the AVC action of the diodes 93 and 97 is slowed down to approximately the speed of the AVC action of the diodes in the amplifier 16, then all of the diodes in the varistor circuitry will attenuate at about the same rate, and to about the same degree. Under such conditions, each diode will possess the same dynamic resistance as the other diodes at any given instant, and the attenuation difference between the different AVC stages will then depend only upon the series resistance feeding the high side of the diode bridge.

A sudden change in the signal input to the amplifier 16 will produce a bias voltage change in the main AVC control line. If only a small capacitance, or no capacitance at all, is shunted across the third diode bridge (diodes 93 and 97) the effect of the AVC control voltage change will be much quicker on the diodes in the amplifier 26 than on the diodes in the amplifier 16. The diodes in the amplifier 26 will attenuate first and reduce the AVC control voltage applied to the diodes in the amplifier 16 which are much slower to react, thereby causing the diodes in the amplifier 26 to have the greatest effect in handling a rapidly changing seismic wave pulse. The difference in relative effectiveness in the two AVC loops can be modified over a wide range by the choice of capacitors afforded by operation of the switch 103. Only two capacitors are shown by way of example; it being understood that any number could be employed. This produces many advantageous dynamic amplitude characteristics in seismographic recording. These characteristics cannot be obtained by any combination of capacitors in the AVC control line of the amplifier 16 for several reasons. First, the diodes in the amplifier 16 are in a control loop which includes a signal filter (reference numeral 20) of irreducible time delay. Second, the loop gain of the first AVC loop which includes the diodes in both of the amplifiers 16 and 26 is much greater than the loop gain of the second AVC loop which includes only the diodes in the amplifier 26. It is well known that a high gain AVC loop requires more capacity, and therefore more time delay for stable operation than a low gain AVC loop. In the diode bridge circuit utilizing semiconductor diodes 73 and 74 as varistors, the usual high capacity AVC capacitors have been eliminated. Elimination of the usual large capacitance found in the prior art varistor bridge circuitry enables a greater signal resolution because of a faster AVC response time. In the prior art circuitry, arrival of a strong seismic signal pulse charges up the large AVC capacitors in the varistor bridge to provide a large AVC voltage which is present until the capacitors can be discharged through the shunting resistors. Invariably this effect produces temporary AVC over-control on a seismic recording immediately following a strong pulse. If another seismic reflection pulse arrives closely after the large first pulse, the second pulse is suppressed in amplitude because the large AVC capacitors have not had time to discharge before arrival of the second seismic reflection pulse. In the present invention circuitry, elimination of the usual large AVC capacitors obviates this undesirable effect. The capacitance of the capacitor 78 shunting the resistor 76 and of the capacitor 79 shunting the resistor 77 are extremely small and do not enter into determination of the RC time constant of the AVC filter. The purpose of the capacitors 78 and 79 is to prevent the high frequency pre-bias signal utilized prior to firing of a seismic shot from developing a voltage across the bridge resistors 76 and 77. The capacitors 78 and 79 effectively short circuit the pre-bias signal across these resistors to thereby prevent high frequency instability of the amplifier 16. In practice, the capacitance of the capacitors 78 and 79 is less than 1/1000 of the usual capacity of AVC condensers and hence has no significant effect upon AVC attack and release times.

Thus, there has been described novel temperature compensated geophysical amplifier circuitry providing flexible AVC characteristics to enable a multiple choice of dynamic amplitude variations between reflected signals and average background signals in a seismic recording. Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In seismic exploration apparatus, a geophysical amplifier having input terminals for connection to a seismic detector unit and output terminals for connection to a seismic recording apparatus, said geophysical amplifier comprising:
    (a) a first multi-stage amplifier coupled to said input terminals;
    (b) a second multi-stage amplifier, the output of said second multi-stage amplifier being coupled to said output terminals;
    (c) a bandpass filter coupled intermediate said first and second multi-stage amplifiers;
    (d) AVC amplifying means coupled to the output of said second multi-stage amplifier, said AVC amplifying means including at the output thereof a rectifier driver transformer having the series combination of a resistor and a thermistor having predetermined resistance values connected across a predetermined portion of the primary winding thereof;
    (e) rectifier means having its input coupled across the secondary winding of the rectifier transformer at the output of said AVC amplifying means;
    (f) filter means coupled to the output of said rectifier means, said filter means including first and second output leads, said filter means including first adjustable capacitance means coupled between said first and second output leads;
    (g) first AVC coupling means connected between the output leads of said filter means and the input of a predetermined amplifier stage in said first multi-stage amplifier for the application of an AVC control voltage to said first multi-stage amplifier, said first AVC coupling means including a first varister lattice network; and
    (h) second AVC coupling means connected between the output leads of said filter means and a predetermined amplifier stage in said second multi-stage amplifier for the application of an AVC control voltage to said second multi-stage amplifier, said second AVC coupling means including a second varister lattice network having its input coupled through first isolating resistance means to said first output lead of said filter means and through second isolating resistance means to the second output lead of said filter means, said second AVC coupling means including second adjustable capacitance means coupled in shunt across the input of said second varister lattice network.

2. In seismic exploration apparatus, a geophysical amplifier having input terminals for connection to a seismic detector unit and output terminals for connection to a seismic recording apparatus, said geophysical amplifier comprising:
    (a) a first emitter-follower stage;
    (b) input coupling means connected between said input terminals and the input of said first emitter-follower stage;
    (c) a first temperature compensated transistor-amplifier stage coupled to the output of said first emitter-follower stage;
    (d) a second emitter-follower stage coupled to the output of said first transistor-amplifier stage;
    (e) a bandpass filter, the pass band of which includes the frequencies of seismic signals it is desired to record, the input of said bandpass filter being coupled to the output of said second emitter-follower stage;
    (f) a third emitter-follower stage coupled to the output of said bandpass filter;
    (g) a second temperature compensated transistor-amplifier stage coupled to the output of said third emitter-follower stage;
    (h) a fourth emitter-follower stage coupled to the output of said second transistor-amplifier stage;

(i) a third temperature compensated transistor-amplifier stage coupled to the output of said fourth emitter-follower stage;

(j) output coupling means coupling the output of said third transistor-amplifier stage to said output terminals;

(k) AVC amplifying means coupled to the output of said third transistor-amplifier stage;

(l) rectifier means coupled to the output of said AVC amplifyinig means;

(m) filter means coupled to the output of said rectifier means, said filter means including first and second output leads, said filter means including first adjustable capacitance means coupled between said first and second output leads;

(n) first AVC coupling means connected between the output leads of said filter means and the input of said first emitter-follower stage for the application of an AVC control voltage to said first emitter-follower stage;

(o) second AVC coupling means connected between the output leads of said filter means and the input of said second emitter-follower stage for the application of an AVC control voltage to said second emitter-follower stage; and (p) third AVC coupling means connected between the output leads of said filter means and the input of said fourth emitter-follower stage for the application of AVC control voltages to said fourth emitter-follower stage, said third AVC coupling means including first isolating resistance means at the input thereof in series with said first output lead of said filter means and second isolating resistance means at the input thereof in series with said second output lead of said filter means, said third AVC coupling means including second adjustable capacitance means coupled in shunt across said first and second filter output leads and isolated therefrom by said first and second resistance means.

3. In seismic exploration apparatus, a geophysical amplifier having input terminals for connection to a seismic detector unit and output terminals for connection to a seismic recording apparatus, said geophysical amplifier comprising:

(a) a first emitter-follower stage;

(b) input coupling means connected between said input terminals and the input of said first emitter-follower stage;

(c) a first temperature compensated transistor-amplifier stage coupled to the output of said first emitter-follower stage;

(d) a second emitter-follower stage coupled to the output of said first transistor-amplifier stage;

(e) a bandpass filter, the pass band of which includes the frequencies of seismic signals it is desired to record, the input of said bandpass filter being coupled to the output of said second emitter-follower stage;

(f) a third emitter-follower stage coupled to the output of said bandpass filter;

(g) a second temperature compensated transistor-amplifier stage coupled to the output of said third emitter-follower stage;

(h) a fourth emitter-follower stage coupled to the output of said second transistor-amplifier stage;

(i) a third temperature compensated transistor-amplifier stage coupled to the output of said fourth emitter-follower stage;

(j) output coupling means coupling the output of said third transistor-amplifier stage to said output terminals;

(k) AVC amplifying means coupled to the output of said third transistor-amplifier stage, said AVC amplifier means including at the output thereof a rectifier driver transformer having the series combination of a resistor and a thermistor having predetermined resistance values connected across a predetermined portion of the primary winding thereof;

(l) rectifier means having its input coupled across the secondary winding of the rectifier driver transformer at the output of said AVC amplifying means;

(m) filter means coupled to the output of said rectifier means, said filter means including first and second output leads, said filter means including first adjustable capacitance means coupled between said first and second output leads;

(n) first AVC coupling means connected between the output leads of said filter means and the input of said first emitter-follower stage for the application of an AVC control voltage to said first emitter-follower stage, said first AVC coupling means including a first varistor lattice network utilizing semiconductor diodes as varistors; and (o) second AVC coupling means connected between the output leads of said filter means and the input of said fourth emitter-follower stage for application of an AVC control voltage to said fourth emitter-follower stage, said second AVC coupling means including a second varistor lattice network utilizing semiconductor diodes as varistors, said second AVC coupling means having its input coupled through first isolating resistance means to said first output lead of said filter means and through second isolating resistance means to said second output lead of said filter means, said second AVC coupling means including second adjustable capacitance means coupled in shunt across the input of said second varistor lattice network.

4. In seismic exploration apparatus, a geophysical amplifier having input terminals for connection to a seismic detector unit and output terminals for connection to a seismic recording apparatus, said geophysical amplifier including a junction terminal and a common bus for the coupling thereacross of a source of direct current, said geophysical amplifier comprising:

(a) a first emitter-follower stage;

(b) input coupling means connected between said input terminals and the input of said first emitter-follower stage;

(c) a first transistor-amplifier stage coupled to the output of said first emitter-follower stage, said first transistor-amplifier stage including a first transistor having a base electrode, an emitter electrode and a collector electrode, a first resistance network connected between said junction terminal and said common bus, said first resistance network being coupled to said base and collector electrodes of said first transistor, and the series combination of a first resistor and a first sensistor connected between the emitter electrode of said first transistor and said common bus;

(d) a second emitter-follower stage, the input of said second emitter-follower stage being coupled to the output of said first transistor-amplifier stage;

(e) a bandpass filter, the pass band of which includes the frequencies of seismic signals it is desired to record, the input of said bandpass filter being coupled to the output of said second emitter-follower stage;

(f) a third emitter-follower stage coupled to the output of said bandpass filter;

(g) a second transistor-amplifier stage coupled to the output of said third emitter-follower stage, said second transistor-amplifier stage including a second transistor having a base electrode, an emitter electrode and a collector electrode, a second resistance network coupled between said junction terminal and said common bus, said second resistance network being coupled to the base and collector electrodes of said second transistor, and the series combination of a second resistor and a second sensistor connected between the emitter-electrode of said second transistor and said common bus;
(h) a fourth emitter-follower stage, the input of said fourth emitter-follower stage being coupled to the output of said second transistor-amplifier stage;
(i) a third transistor-amplifier stage coupled to the output of said fourth emitter-follower stage, said third transistor-amplifier stage including a third transistor having a base electrode, an emitter electrode and a collector electrode, a third resistance network coupled between said junction terminal and said common bus, said third resistance network being coupled to said base and collector elements of said third transistor, and the series combination of a third resistor and a third sensistor connected between the emitter electrode of said third transistor and said common bus;
(j) output coupling means coupling the output of said third transistor-amplifier stage to said output terminals;
(k) AVC amplifying means coupled to the output of said third transistor-amplifier stage;
(l) rectifier means coupled to the output of said AVC amplifying means;
(m) filter means coupled to the output of said rectifier means, said filter means including first and second output leads, said filter means including first adjustable capacitance means coupled between said first and second output leads;
(n) first AVC coupling means connected between the output leads of said filter means and the input of said first emitter-follower stage for the application of an AVC control voltage to said first emitter-follower stage;
(o) second AVC coupling means connected between the output of said filter means and the input of said second emitter-follower stage for the application of an AVC control voltage to said second emitter-follower stage; and
(p) third AVC coupling means connected between the output leads of said filter means and the input of said fourth emitter-follower stage for the application of an AVC control voltage to said fourth emitter-follower stage, said third AVC coupling means including first isolating resistance means at the input thereof in series with said first output lead of said filter means and second isolating resistance means at the input thereof in series with said second output lead of said filter means, said third AVC coupling means including second adjustable capacitance means coupled in shunt across said first and second filter output leads and isolated therefrom by said first and second resistance means.

5. In seismic exploration apparatus, a geophysical amplifier having input terminals for connection to a seismic detector unit and output terminals for connection to a seismic recording apparatus, said geophysical amplifier including a junction terminal and a common bus for the coupling thereacross of a source of direct-current, said geophysical amplifier comprising:
(a) a first emitter-follower stage;
(b) input coupling means connected between said input terminals and the input of said first emitter-follower stage;
(c) a first transistor-amplifier stage including a first transistor having a base electrode, an emitter electrode and a collector electrode, first resistance means coupled between said junction point and the collector electrode of said first transistor, a second resistor coupled between said junction terminal and the base electrode of said first transistor, a third resistor connected between the base electrode of said first transistor and said common bus, and the series combination of a fourth resistor and a first sensistor connected between the emitter electrode of said first transistor and said common bus, the resistance values of said first through said fourth resistors and said first sensistor being selected to maintain the input resistance of said first transistor constant with varying temperature, the base element of said first transistor being coupled to the output of said first emitter-follower stage;
(d) a second emitter-follower stage, the input of said second emitter-follower stage being coupled to the collector electrode of said first transistor;
(e) a bandpass filter the pass band of which includes the frequencies of seismic signals it is desired to record, the input of said bandpass filter being coupled to the output of said second emitter-follower stage;
(f) a third emitter-follower stage coupled to the output of said bandpass filter;
(g) a second transistor-amplifier stage including a second transistor having a base electrode, an emitter electrode and a collector electrode, a fifth resistor coupled between said junction terminal and the collector electrode of said second transistor, a sixth resistor coupled between said junction terminal and the base electrode of said second transistor, a seventh resistor connected between the base electrode of said second transistor and said common bus, and the series combination of an eighth resistor and a second sensistor connected between the emitter electrode of said second transistor and said common bus, the resistance values of said fifth through said eighth resistors and said second sensistor being selected to maintain the input resistance and gain of said second transistor constant with varying temperature, the base electrode of said second transistor being coupled to the output of said third emitter-follower stage;
(h) a fourth emitter-follower stage, the input of said fourth emitter-follower stage being coupled to the collector element of said second transistor;
(i) a third transistor-amplifier stage including a third transistor having a base electrode, an emitter electrode and a collector electrode, a ninth resistor coupled between said junction terminal and the collector electrode of said third transistor, a tenth resistor coupled between said junction point and the base electrode of said third transistor, an eleventh resistor connected between the base electrode of said third transistor and said common bus, and the series combination of a twelfth resistor and a third sensistor connected between the emitter electrode of said third transistor and said common bus, the resistance values of said ninth through said twelfth resistors and said third sensistor being selected to maintain the input resistance and gain of said third transistor constant with varying temperature, the base electrode of said third transistor being coupled to the output of said fourth emitter-follower stage;
(j) output coupling means connected between the output terminals and the collector electrode of said third transistor and said common bus;
(k) AVC amplifying means, said AVC amplifying means including at the output thereof a rectifier driver transformer having the series combination of a thirteenth resistor and a thermistor having predetermined resistance values connected across a predetermined portion of the primary winding thereof;
(l) means for sampling the electrical signal voltage output of said third transistor-amplifier stage and applying the sampled voltage to the input of said amplifying means;
(m) rectifier means having its input coupled across the secondary winding of the rectifier transformer at the output of said AVC amplifying means;
(n) filter means coupled to the output of said rectifier means, said filter means including first and second output leads for the application thereacross of AVC control voltages derived from the output of said rectifier means, said filter means including first adjustable capacitance means coupled between said first and second output leads;

(o) first AVC coupling means connected between the output leads of said filter means and the input of said first emitter-follower stage for the application of AVC control voltages to said first emitter-follower stage, said first AVC coupling means including a first varistor lattice network; and, second AVC coupling means connected between the output leads of said filter means and the input of said fourth emitter-follower stage for the application of AVC control voltages to said fourth emitter-follower stage, said second AVC coupling means including a second varistor lattice network having its input coupled through first isolating resistance means to said first output lead of said filter means and through second isolating resistance means to said second output lead of said filter means, said second AVC coupling means including second adjustable capacitance means coupled in shunt across the input of said second varistor lattice network.

6. In an AVC system including a rectifier driver transformer and wherein an applied signal voltage is amplified and impressed across the primary winding of said rectifier driver transformer, thence rectified and the resulting AVC control voltage applied to AVC-controlled amplifier stages through a varistor lattice network utilizing semiconductor diodes as varistors, the improvement comprising the series combination of a resistor and a thermistor connected across a predetermined portion of the primary winding of said rectifier driver transformer, the resistance values of said resistor and thermistor being selected to compensate for the negative temperature coefficient of resistance of the semiconductor diode varistors and thereby render the resulting AVC output voltage substantially independent of temperature.

References Cited by the Examiner
UNITED STATES PATENTS

| | | | |
|---|---|---|---|
| 2,764,643 | 9/56 | Sulzer | 330—29 |
| 2,952,006 | 9/60 | McCarter | 340—15 |

FOREIGN PATENTS

| | | |
|---|---|---|
| 591,358 | 1/60 | Canada. |

ROY LAKE, *Primary Examiner.*

NATHAN KAUFMAN, *Examiner.*